US007467387B2

(12) United States Patent
Mayes et al.

(10) Patent No.: US 7,467,387 B2
(45) Date of Patent: Dec. 16, 2008

(54) METHOD FOR OFF-LOADING USER QUERIES TO A TASK MANAGER

(75) Inventors: Peter J. D. Mayes, Reading (GB); Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 10/159,546

(22) Filed: May 31, 2002

(65) Prior Publication Data

US 2003/0225918 A1   Dec. 4, 2003

(51) Int. Cl.
G06F 3/00 (2006.01)
G06F 9/44 (2006.01)
G06F 9/46 (2006.01)
G06F 13/00 (2006.01)

(52) U.S. Cl. ...................... 719/314; 719/320
(58) Field of Classification Search ............ 714/4; 364/200; 719/311–320
See application file for complete search history.

(56) References Cited

U.S. PATENT DOCUMENTS

| 4,831,518 | A | * | 5/1989 | Yu et al. ................ 714/4 |
| 5,797,000 | A | | 8/1998 | Bhattacharya et al. |
| 5,881,227 | A | | 3/1999 | Brenner et al. |
| 5,881,232 | A | | 3/1999 | Cheng et al. |
| 5,925,137 | A | * | 7/1999 | Okanoue et al. ......... 714/4 |
| 6,012,150 | A | | 1/2000 | Bartfai et al. |
| 6,085,186 | A | | 7/2000 | Christianson et al. |
| 6,102,969 | A | | 8/2000 | Christianson et al. |
| 6,125,360 | A | | 9/2000 | Witkowski et al. |
| 6,148,296 | A | | 11/2000 | Tabbara |
| 6,184,996 | B1 | * | 2/2001 | Gase ................ 358/1.15 |
| 6,263,328 | B1 | | 7/2001 | Coden et al. |
| 6,275,818 | B1 | | 8/2001 | Subramanian et al. |
| 6,407,680 | B1 | * | 6/2002 | Lai et al. ............... 341/50 |
| 6,864,991 | B1 | * | 3/2005 | Takahashi .............. 358/1.15 |
| 6,976,072 | B2 | * | 12/2005 | Mathieson ............. 709/224 |
| 2002/0019844 | A1 | * | 2/2002 | Kurowski et al. ....... 709/201 |
| 2003/0101213 | A1 | * | 5/2003 | Wright ................ 709/203 |
| 2005/0004977 | A1 | * | 1/2005 | Roberts et al. ......... 709/203 |

OTHER PUBLICATIONS

Shen et al, Neptune: Scalable Replication Management and Programming Support for Cluster-based network Services, University of California, 2001, pp. 1-12.*

(Continued)

*Primary Examiner*—Meng-Ai An
*Assistant Examiner*—Diem K Cao
(74) *Attorney, Agent, or Firm*—Lawrence D. Cutter; Jeffrey Giunta; Fleit Gibbons Gutman Bongini & Bianco P.L.

(57) ABSTRACT

A method that off-loads the processing associated with responding to user status requests for software task execution queues or for queued software tasks that are managed by a software task manager. A software task manager is periodically queried for status and the results of that periodic query are stored in a file. User queries for the status of the software task manager are handled by a separate process that can operate on the same or on a separate computing node than is hosting the software task manager. Queries submitted by users for the status of queues or queued software tasks managed by the software task manager are satisfied by retrieving the status data that are stored in the file. Alternative embodiments distribute copies of the file to several computing nodes to further alleviate the processing bottleneck caused by responding to frequent task manager status queries from many users.

9 Claims, 3 Drawing Sheets

OTHER PUBLICATIONS

Webopedia, "What is a database", Jun. 2003, p. 1.*
U.S. Appl. No. 09/567,959, filed May 9, 2000, Sinn et al.
U.S. Appl. No. 09/728,095, filed Dec. 1, 2000, Judicibus.
U.S. Appl. No. 09/788,892, filed Feb. 20, 2001, Lin et al.
U.S. Appl. No. 09/809,253, filed Mar. 16, 2001, Tsuchida et al.

* cited by examiner

METHOD FOR OFF-LOADING USER QUERIES TO A TASK MANAGER

BACKGROUND OF THE INVENTION

1. Field of the Invention

The present invention relates to monitoring software tasks that are executing on a computer system, and more specifically to a system and method for allowing users to query the status of executing computer tasks.

2. Description of Related Art

Large computing systems are able to be used by a large number of users that can number into the hundreds and even thousands. These computing systems have software task management facilities that accept software tasks, which are sometimes referred to as "jobs," and that manage the execution of those software tasks. The management of these software tasks can include queuing these jobs with or without prioritization relative to each other and then executing the queued jobs as computing resources become available. These computing systems are sometimes made up of several computers or nodes that are interconnected together and that are configured to operate in a manner so as to appear to be a single computer. An example of such a computing system is a computer cluster, where many computers are interconnected using high-speed and dedicated communications links between one another in order to support efficient parallel and/or coordinated operations and processing. Other examples include multiple computers that are interconnected by more conventional communications means, such as computer networks.

The software task management system used by these computer systems allows users to request the status of the execution queues that contain the tasks that are queued for execution on the one or more computers controlled by that software task management system. This software task management system also allows querying of the status of a particular task that is contained within the execution queue. Determining the status of the software task execution queue or of a particular task within the queue is an additional processing burden on the software task management system. The queue of software tasks that are awaiting execution grows as the nodes of the computer system become more heavily loaded. The users of such heavily loaded computer systems will request the status of the queued software tasks, as well as the status of the queue itself, in order to determine, or to try to estimate, when their previously submitted software task is likely to execute. Users also query the status of the software task execution queue to determine if it is practical to submit new tasks because the wait for execution may be long.

As the computers become more heavily loaded with submitted software tasks and the queue of software tasks awaiting execution becomes long, the users issue requests for the status of the queue and of their submitted tasks with increasing frequency. Automated software programs that are able to repetitively submit status requests to the software task management system can also be used by the users. In computer systems that support hundreds or thousands of users, satisfying the status requests from all of these users clamoring for the status of the queue and the position of their submitted software tasks within the queue can become a significant burden for the software task management system as well as create a large processing demand for the computer upon which the software task management system is executing. This results in long delays for the return of the requested status for a queue or a queued software task, and additional delay in the execution of tasks as the computing resources used to satisfy these many status requests cannot be used to execute the queued software tasks.

In order to more effectively handle the many status requests submitted to a heavily loaded computer system while minimizing the processing load presented by these status requests, an efficient way to satisfy user queries to a task manager is needed.

SUMMARY OF THE INVENTION

In view of these drawbacks, it is an object of the present invention to remove the above-mentioned drawbacks and to provide systems and methods for off-loading user queries to a task manager.

One embodiment of the present invention provides a method for responding to system status requests. The method periodically stores a status of a system. The method then receives a system status request and responds to the system status request based upon the status of the system that was stored.

Another embodiment of the present invention provides a system status reporting system. The task manager status reporting system has a status storage that stores a status of a system. The system further has a system status request receiver that receives a system status request. The system also has a system status responder that responds to the system status request based on the stored status of the system.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
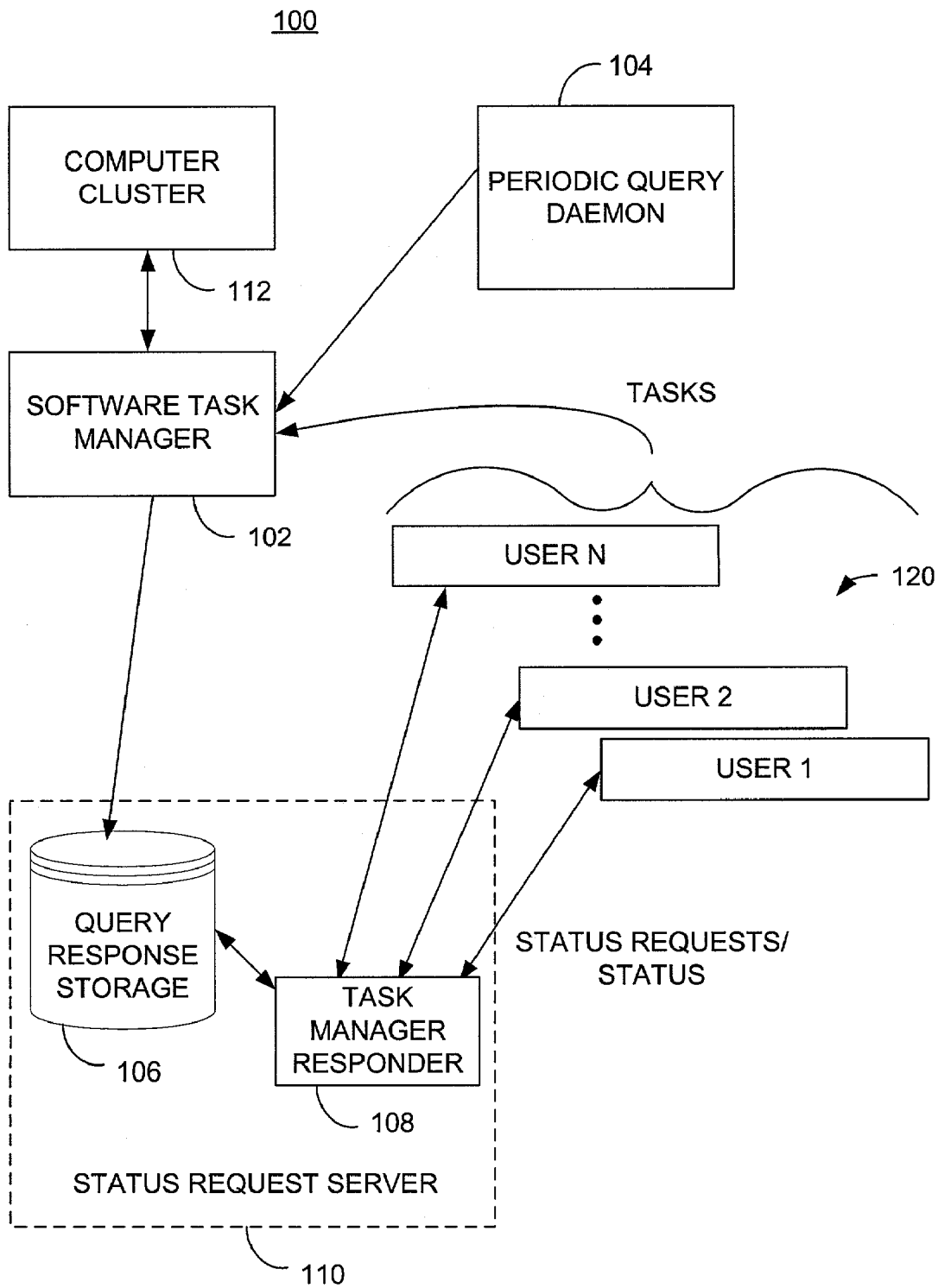
FIG. 1 is a schematic diagram of a processing architecture for a task manager query system in accordance with an exemplary embodiment of the present invention.

The exemplary embodiments of the present invention implement an efficient system to provide task manager status information to computer users. A schematic diagram of a processing architecture 100 for an exemplary embodiment of the present invention is illustrated in FIG. 1. The exemplary processing architecture 100 has a software task manager 102 that accepts and submits software processing tasks, which are simply referred to as tasks in this specification, to a computer cluster 112. The computer cluster of this exemplary embodiment consists of several computers or computer nodes that are interconnected via a high speed communications network.

Alternative embodiments of the present invention have only one computer node or computer nodes that are interconnected via other communications interconnections. The software task manager 102 of the exemplary embodiment is the LoadLeveler software package available from International Business Machines Corporation (IBM) of Armonk, N.Y. However, the present invention is not so limited. The present invention is applicable to any queuing system, and is particularly suited for use with queuing systems that handle queries from many users.

The software task manager accepts tasks from one or more users 120. Users 120 are software processes or human computer users that have access to the software task manager. Each user within the one or more users 120 is not required to be able to submit tasks to the software task manager 102, but may be able to simply query the status of the software task manager 102 without authorization to submit tasks.

The software task manager 102 of the exemplary embodiment receives periodic status queries from a periodic query daemon 104. The periodic query daemon 104 is the task manager querying module of the exemplary embodiment and is a background processing task that is able to operate on any computer with access to the software task manager 102, including on the same computer as is hosting the software task manager 102. The types of queries performed by the periodic query daemon 104 are described in detail below.

The queries submitted by the periodic query daemon 104 are configured so as to cause the software task manager 102 to provide the response to one or more query response storage 106 elements. The query response storage 106 is a data file within a shared file system space in the exemplary embodiment. The status request server 110 is one or more processing modules that accepts task manager status requests from the one or more users 120. The status request server 110 also contains a status responder 108 that receives the status queries from the one or more users 120, extracts the data required to respond to each status query and transmits the response back to the requesting user 120. In the exemplary embodiment, the task manager responder 108 contains a task manager status request receiver, which receives the status requests submitted by the one or more users 120, and a task manager status responder, which retrieves data from the query response storage 106 and sends the status information to the destination specified by the requesting user.

The exemplary embodiment operates with the periodic query daemon 104 periodically submitting queries to the software task manager 102 according to a set schedule. The results of these status queries are stored in the status response storage 106. User queries are sent to one or more status request servers that respond to user requests based upon the results stored in the query response storage 106. This allows computing resources to be dedicated to the software task manager 102 and prevents an excessive amount of these resources from being used to respond to user status queries. Thus, the exemplary embodiment of the present invention advantageously isolates the software task manager 102 from these direct status queries.

Figure 2:
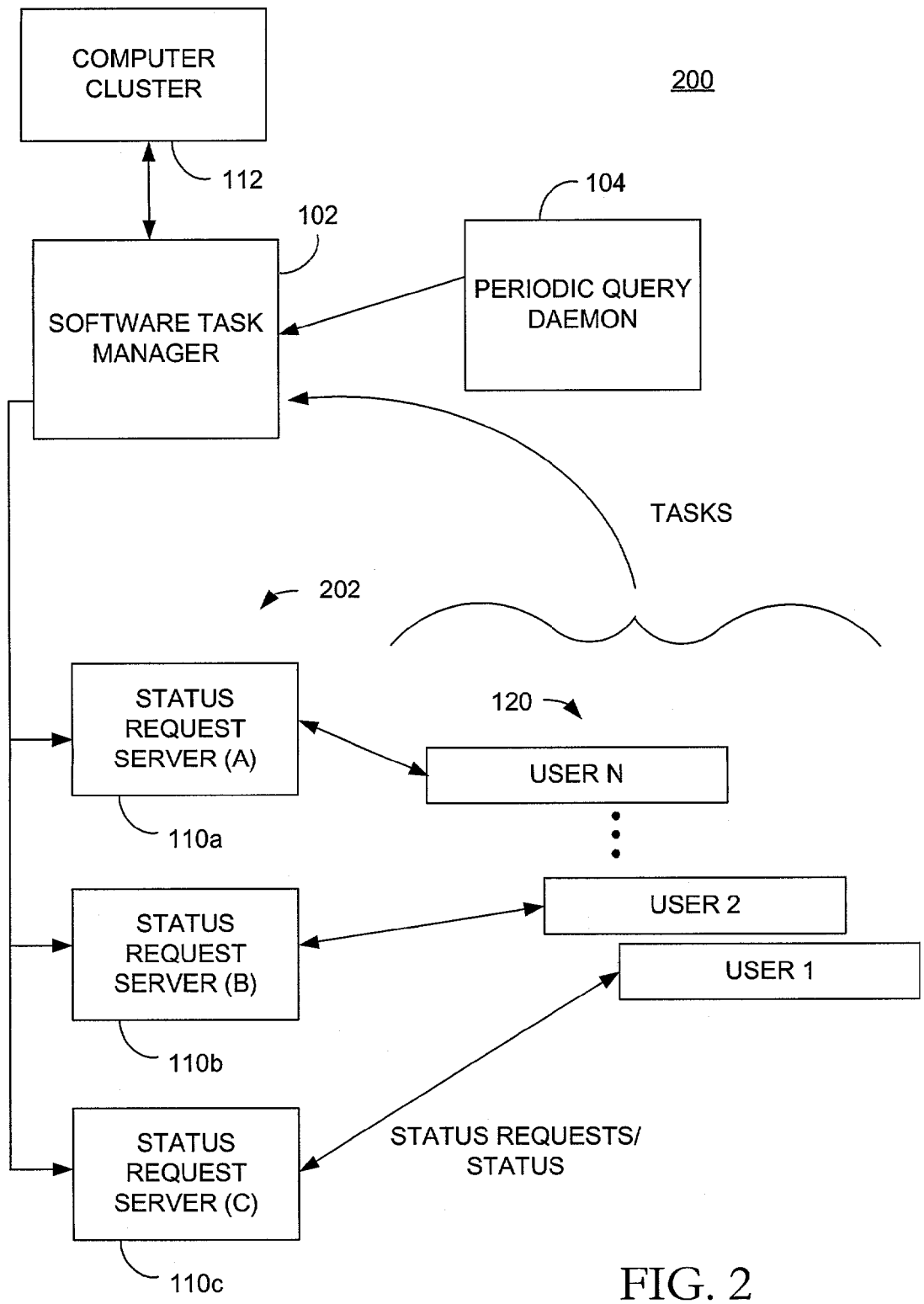
FIG. 2 is a schematic diagram of a processing architecture for a task manager query system in accordance with another exemplary embodiment of the present invention.

A multiple status request server processing architecture 200 according to another exemplary embodiment of the present invention is illustrated in FIG. 2. The multiple status request server processing architecture 200 includes a software task manager 102, a periodic query daemon 104 and the one or more users 120, as are present in the exemplary processing architecture 100 of FIG. 1. The multiple status request server processing architecture 200, however, additionally includes multiple status request servers 202, such as of status request server (A) 110a, status request server (B) 110b, and status request server (C) 110c in this exemplary embodiment. Each of the status request servers within the multiple status request servers 202 contains a query response storage 106 and a status responder 108.

In an exemplary embodiment of the multiple status request server processing architecture 200, the software task manager 102 communicates the results of the status query to one status request server, e.g., status request server (A) 110a, that, in turn, retransmits that status to each of the other the task processing queue request servers within the multiple status request servers 202. Alternative embodiments that similarly have multiple status request servers are able to configure the software task manager 102 to communicate the results directly to each of the multiple status request servers. This results in storing a copy of the task manager's status in each of the status request servers within the multiple status request servers 202. User status requests in this embodiment are then distributed to these multiple status requests servers 202 either randomly, by assigning different user sub-groups to different status request servers, or the status requests are distributed among the multiple status request servers 202 via other distribution rules. In an exemplary embodiment, the status query executables themselves include random selection processing to randomly determine which status request server to query. In this exemplary embodiment, each of the status request servers within the multiple status request servers 202 execute on a different computing node in order to distribute the processing load associated with receiving, processing and responding to task manager status requests among those different computing nodes. Thus, while a single computing node handling all task manager status requests can become another processing bottleneck even though the software task manager 102 itself is relieved of responding to each of the user's status requests, this architecture of this embodiment advantageously relieves any single computing node from handling all of the task manager status requests and distributes that processing load among several computing nodes.

Task Manager Status Request Processing

Figure 3:
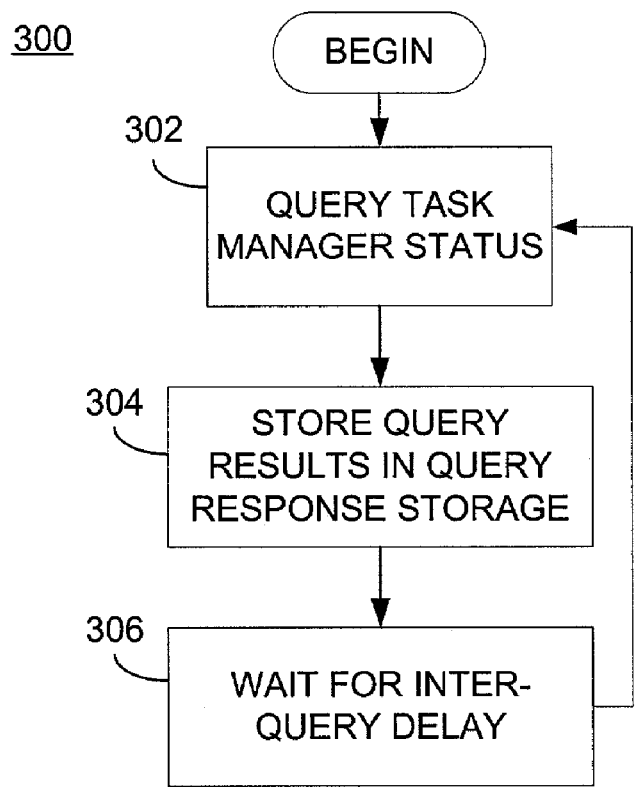
FIG. 3 is a process flow diagram for periodically querying for the status of a task manager in accordance with an exemplary embodiment of the present invention.

A periodic query processing flow 300 according to an exemplary embodiment of the present invention is illustrated in FIG. 3. This processing flow begins by querying, at step 302, the software task manager 102 for a status of that task manager. This query is submitted by the periodic query daemon 104 in the exemplary embodiments described above. The periodic query daemon 104 is able to be configured to submit different types of queries either at the same time or at different times. Examples of the different types of queries that are able to be submitted to the software task manager 102 include the "llq" and "llstatus" status query that are supported by the LoadLeveler software package utilized by the exemplary embodiments as the software task manager 102. The llq status query causes the software task manager 102 of the exemplary embodiments to return the status of the queue of software tasks that is managed by the software task manager 102. The llstatus status query causes the software task manager 102 of the exemplary embodiments to return the status of computing nodes that are used to execute the software tasks managed by the software task manager 102.

These and the other status query commands are able to have command parameters, or flags, that specify different types of data that are to be included with the status response by the software task manager 102. Examples of command flags for the llstatus query command include a "−1" flag that causes a long listing to be generated with more information than is included when the −1 flag is not included in the command. Specific data items are able to be requested with the llstatus query command by including the "-f" flag followed by a specification of the information to be returned. Another example is the ability to specify the computing nodes for which status is to be returned by the llstatus command. The llq command has similar flags that are able to be specified.

The exemplary embodiment is configured to submit a single status query to the software task manager 102 that causes the software task manager to return all of the data that users 120 can request (e.g., by including all possible flags). Alternative embodiments of the present invention are configured to submit multiple status queries to the software task manager 102 such that each status query has different flag combinations. These alternative embodiments submit status queries that have flag combinations that correspond to flag combinations that are able to be submitted by users 120. These alternative embodiments store the status response for each status request and flag combination in separate files. This allows these embodiments to respond to status requests from users by simply transmitting the data file for the flag combination submitted by that user. This simplifies status response processing at the expense of requiring the software task manager to respond to multiple status requests and having to store the multiple status responses in multiple files.

Other alternative embodiments may restrict the status data that the users 120 are able to request and request only a limited amount of the possible status data from the software task manager. Other alternative embodiments utilize the processing of the exemplary embodiment to provide only the more commonly requested status elements, and allow the users 120 to directly query the software task manager 102 for further information that is more rarely requested.

The task manager status query submitted to the software task manager 102 specifies that the software task manager 102 is to provide the status output data to the one or more query response storage 106 elements. In embodiments of the present invention that have only one status request server 110, the status reported by the software task manager 102 is only provided, at step 304, to the query response storage 106 of that single status request server 110. In embodiments that have multiple status request servers 202, the status request submitted by the periodic query daemon 104 either specifies that each query response storage within the multiple status request servers 202 is to receive the status data or that a single status request server receives the response and that status request server communicates the response to the other status request servers.

Once the periodic query daemon 104 has submitted a status query to the software task manager 102 and the software task manager 102 has provided status output data to the one or more query response storage 106 elements, the query results or the status output data are stored into the query response storage 106. The query response storage 106 in the exemplary embodiment is one or more data files stored in shared file system space. The exemplary embodiment of the present invention is configured to request the "long" status output from the software task manager. This long status output that is requested in the operation of the exemplary embodiments contains all possible status information and contains more information than is requested in some or most of the status requests submitted by the users 120. All of this information is stored within the query response storage 106 in order to support responding to the wide variety of status requests that are submitted by the users 120. Alternative embodiments of the present invention submit multiple status queries to the software task manager 102 such that each multiple status query has a different flag combination. In these embodiments, the responses to these multiple status queries are stored in different data files within the query response storage 106.

After the status data are stored in the query response storage 106, the processing of the exemplary embodiment then waits, at step 306, for the period between status queries. The exemplary embodiment is configured to delay on the order of ten to fifteen seconds between queries, which corresponds to the delay performed in this step. Preferably, this delay is configurable by the system administrator. After this delay, the processing again queries, at step 302, the status of the task manager.

Figure 4:
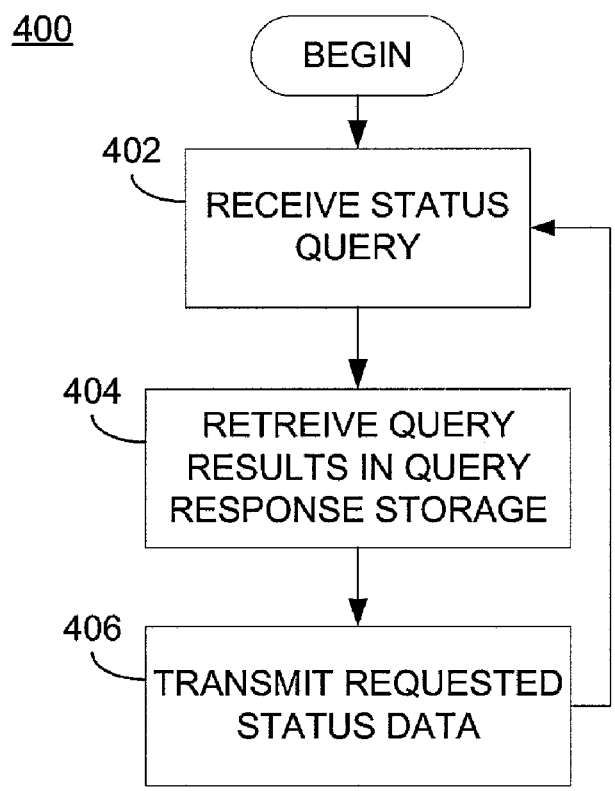
FIG. 4 is a process flow diagram for requesting task manager status in accordance with an exemplary embodiment of the present invention.

The status response processing flow 400 of the exemplary embodiment is illustrated in FIG. 4. This status response processing flow 400 is initiated when a status query is made by a user 120. The exemplary embodiment replaces the executable software that implements commands that are used by users 120 to submit status queries to the software task manager 102 with command scripts that implement the status response processing. Replacing the executable software "binaries" that implement status queries to the software task manager with command scripts allows easy maintenance and modification of these command scripts to support different functionality and options. This also results in not requiring modification to the software task manager code because all of the new processing is contained within these scripts. The exemplary embodiment utilizes PERL scripts to implement this processing.

A status query made by a user within the one or more users 120 is received, at step 402, when the user executes the status query command script. The status query command script is the task manager responder 108 in the exemplary embodiment. Embodiments of the present invention that include multiple status request servers 202 include status query command scripts that are configured to query one of the multiple status request servers 202. These embodiments have status query command scripts that randomly select a status request server within the multiple status request servers 202. The division of status requests from users is alternatively accomplished in some embodiments by assigning each user within the one or more users 120 to a particular status request server. Other embodiments distribute the status requests to the status request servers in a round robin manner utilizing conventional techniques. Yet other embodiments use different techniques such as random distribution to distribute the received status requests.

The status request submitted by the user in this exemplary embodiment is able to specify the status data that are requested, and is able to request all of the status data that are requested by the periodic query daemon 104 or the status query is able to request just a subset of that data. The status data specified within the status query submitted by the user are retrieved, at step 404, by the task manager responder 108 from the query response storage 106. The exemplary embodiment stores the status query response data in a file and then extracts the requested data (i.e., all or a subset based upon the flags specified by the user 120 in the request) from that file in response to a status request. After the requested data are obtained from the query response storage 106, a response message is constructed and transmitted, at step 406, to the requesting user. The processing then returns to await the receipt of a new status query, at step 402.

The present invention allows the off-loading of the processing queue status queries from the software task manager 102. Handling the processing queue status queries in a separate process, that is able to be hosted on a separate computer processor, relieves the task manager from having to respond to the queries. In the exemplary embodiments of the present invention, the software task manager only receives one or a limited number of status queries in each query period and the results of these queries are stored in a file. The user status requests are satisfied by simply retrieving the status from this file. This prevents resources for the task manager being allocated to responding to user requests and instead allows these computing resources to be dedicated to the task manager and task execution for more efficient overall processing. This can result in significant performance increases in a heavily-loaded system.

The present invention can be realized in hardware, software, or a combination of hardware and software. Any kind of computer system-or other apparatus adapted for carrying out the methods described herein-is suited. A typical combination of hardware and software could be a general purpose computer system with a computer program that, when loaded and executed, controls the computer system such that it carries out the methods described herein.

The present invention can also be embedded in a computer program product, which comprises all the features enabling the implementation of the methods described herein, and which-when loaded in a computer system-is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each computer system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for responding to system status requests, the method comprising:
    periodically receiving, at a first computing processor operating on a first computing node, a computing task queue status for a computing task queue operating on a second computing node, the second computing node being different than the first computing node;
    storing, in response to the periodically receiving, the computing task queue status on the first computing node into a storage;
    communicating, from a requesting node operating on a requesting computing processor to an electrical data connection of the first computing processor operating on the first computing node, a system computing task queue status request for at least a portion of the computing task queue status for the computing task queue operating on the second computing node, the requesting node comprising the requesting computing processor that is different than the first computing processor;
    receiving, through the electrical data connection of the first computing node, the system computing task queue status request;
    retrieving, in response to the receiving, the at least a portion of the computing task queue status from the storage;
    sending, to the requesting node in response to receiving the system computing task queue status request, a computing task queue status response data message containing the at least a portion of the computing task queue status;
    transmitting, in response to the receiving the computing task queue status, the computing task queue status from the first computing node to a third computing node;
    storing the computing task queue status on the third computing node;
    receiving, at the third computing node, a second system task status request for at least a portion of the computing task queue status for the task queue operating on the second computing node; and
    responding to the system status request based on the computing task queue status stored on the third computing node.

2. The method as defined in claim 1 wherein the system computing task queue status request comprises a request for a subset of data for each queue entry that is stored on the first computing node describing the computing task queue status for queue entries in the computing task queue operating on the second computing node, the subset having less than all data available for each queue entry from the second computing node.

3. The method as defined in claim 1, further comprising the step of periodically querying, at a time period that is independent of communicating the system computing task queue status request, the second computing node for the computing task queue status of the second computing node, and
    wherein the computing task queue status comprises a computing task queue status response describing at least one status of the computing task queue operating on the second computing node.

4. The method as defined in claim 3, wherein the time period is a predetermined and uniform period.

5. The method as defined in claim 1, wherein the computing task queue status comprises a subset of less than all available computing task queue status provided by the second computing node, and wherein the computing task queue status request is limited to one of all of the subset of available computing task queues status and a further subset of the subset of available computing task queue status.

6. A method for responding to system status requests, the method comprising:
    periodically receiving, at a first computing processor operating on a first computing node, a computing task queue status for a computing task queue operating on a second computing node, the second computing node being different than the first computing node;

storing, in response to the periodically receiving, the computing task queue status on the first computing node into a storage;

communicating, from a requesting node operating on a requesting computing processor to an electrical data connection of the first computing processor operating on the first computing node, a system computing task queue status request for at least a portion of the computing task queue status for the computing task queue operating on the second computing node, the requesting node comprising the requesting computing processor that is different than the first computing processor;

receiving, through the electrical data connection of the first computing node, the system computing task queue status request;

retrieving, in response to the receiving, the at least a portion of the computing task queue status from the storage;

sending, to the requesting node in response to receiving the system computing task queue status request, a computing task queue status response data message containing the at least a portion of the computing task queue status;

querying the second computing node for the computing task queue status of the second computing node with a query specifying that the computing task queue status is to be sent to the first computing node and a third computing node, the third computing node being separate from the first computing node; and directly sending, from the second computing node in response to the query, the computing task queue status to both the first computing node and a third computing node.

7. A method for responding to system status requests, the method comprising:

periodically receiving, at a first computing processor operating on a first computing node, a computing task queue status for a computing task queue operating on a second computing node, the second computing node being different than the first computing node, wherein the computing task queue status comprises a first subset of computing task queue data that contains less than all available computing task queue data provided by the second computing node, and wherein the periodically receiving further comprises periodically receiving a second computing task queue status, the second computing task queue status comprising a second subset of computing task queue data for the computing task queue operating on the second computing node, the second subset of computing task queue data containing a different subset of the all computing task queue data than is contained in the first subset of computing task queue data;

storing, in response to the periodically receiving, the computing task queue status on the first computing node into a storage;

communicating, from a requesting node operating on a requesting computing processor to an electrical data connection of the first computing processor operating on the first computing node, a system computing task queue status request for at least a portion of the computing task queue status for the computing task queue operating on the second computing node, and wherein the system computing task queue status request is limited to requesting one of the first subset of computing task queue data and the second subset of computing task queue data, the requesting node comprising the requesting computing processor that is different than the first computing processor;

receiving, through the electrical data connection of the first computing node, the system computing task queue status request;

retrieving, in response to the receiving, the at least a portion of the computing task queue status from the storage; and sending, to the requesting node in response to receiving the system computing task queue status request, a computing task queue status response data message containing the at least a portion of the computing task queue status.

8. The method as defined in claim 7, wherein the first set of computing task queue data are stored within a first data file stored in a shared file system space and the second set of computing task queue data is stored within a second data file stored in the shared file system space, and wherein the retrieving the at least a portion of the computing task queue status comprises retrieving, in response to a request for the first set of computing task queue data, data stored in the first data file and retrieving, in response to a request for the second set of computing task queue data, data stored in the second data file.

9. The method as defined in claim 7, further comprising querying, at a first time period, the second computing node for the first set of computing task queue data and querying, at a second time period, the second computing node for the second set of computing task queue data, wherein the first time period and the second time period are independent of communicating the system computing task queue status request.

* * * * *